United States Patent [19]

Kaneko et al.

[11] Patent Number: 5,279,643

[45] Date of Patent: Jan. 18, 1994

[54] PROCESS FOR RECOVERING VALUABLE METALS FROM AN IRON DUST

[75] Inventors: Yasuo Kaneko, 1206-1 Ogawa, Shimodate-shi, Ibaraki-ken; Tsuneyuki Inoue, Shimodate, both of Japan

[73] Assignee: Yasuo Kaneko, Ibaraki, Japan

[21] Appl. No.: 2,353

[22] Filed: Jan. 6, 1993

[30] Foreign Application Priority Data

Jan. 17, 1992 [JP] Japan .................................. 4-026159
May 29, 1992 [JP] Japan .................................. 4-163662

[51] Int. Cl.$^5$ ............................................. C21B 13/02
[52] U.S. Cl. .................................... 75/499; 75/959; 75/961; 423/108
[58] Field of Search .............. 75/499, 660, 961, 959; 423/108

[56] References Cited

U.S. PATENT DOCUMENTS

| | | |
|---|---|---|
| 4,047,942 | 9/1977 | Clark et al. . |
| 4,071,228 | 1/1978 | Tokunaga et al. ............ 75/660 |
| 4,396,422 | 8/1983 | Matsuno et al. . |
| 4,612,041 | 9/1986 | Matsuoka et al. ............ 75/10.14 |
| 4,836,847 | 6/1989 | Bishop et al. . |
| 4,917,723 | 4/1990 | Coyne, Jr. ...................... 75/961 |

FOREIGN PATENT DOCUMENTS

| | | |
|---|---|---|
| 174641 | 3/1986 | European Pat. Off. . |
| 441052 | 8/1991 | European Pat. Off. . |
| 3536635 | 4/1987 | Fed. Rep. of Germany . |
| 59-20734 | 5/1984 | Japan . |
| 64-4572 | 1/1989 | Japan . |
| 2077767 | 12/1981 | United Kingdom . |
| 2077768 | 12/1981 | United Kingdom . |

OTHER PUBLICATIONS

Derwent Publications Ltd., Week 46, 1980, AN 80-81339C & JP-A-55 125 211, Sep. 26, 1980.
Patent Abstracts of Japan, vol. 10, No. 128, May 13, 1986 & JP-A-60 251 234 Dec. 11, 1985.
Derwent Publications Ltd., Week, 12, AN 77-20779Y & JP-A-52 017 321, Feb. 9, 1977.
Derwent Publications Ltd., Wee, 38, AN 84-235960, SU-A-1 068 523, Jan. 23, 1984, Abstract.
Patent Abstracts of Japan, vo. 5, No. 45, Mar. 25, 1981, JP-A-56 000 238, Jan. 6, 1981, Abstract.

*Primary Examiner*—Melvyn J. Andrews
*Attorney, Agent, or Firm*—Wegner, Cantor, Mueller & Player

[57] ABSTRACT

A process for recovering valuable metals from an iron dust using a shaft furnace is disclosed. The iron dust is agglomerated and supplied into a the shaft furnace together with a lump coke and a flux. Valuable metal oxides contained in the iron dust are reduced in this shaft furnace. Volatile metals containing zinc and lead among the valuable metals thus reduced are volatilized within the shaft furnace and reoxidized, and then discharged from the shaft furnace together with an exhaust gas so as to be recovered as a crude zinc oxide. The reduced metal iron and slag are accumulated on a bottom portion of the shaft furnace in their molten states, and then separated and recovered.

8 Claims, 1 Drawing Sheet

PROCESS FOR RECOVERING VALUABLE METALS FROM AN IRON DUST

BACKGROUND OF THE INVENTION

This invention relates to a process for recovering valuable metals such as iron, zinc, and the like from an iron dust using a shaft furnace.

The iron dust includes all kinds of iron making dusts generated during an iron manufacturing process using a blast furnace, an LD converter, an electric steel making furnace, a ferroalloy making furnace, and the like. The iron dust also includes a dry dust which is collected by means of a back filter or the like, and a wet dust such as a sludge or the like which is collected by a wet type dust collector.

In general, the iron dust contains a large quantity of valuable metal oxides such as zinc oxide, iron oxide and the like. A method for recovering these valuable metals is already developed. This recovering method is broadly classified into two; one is a method using a rotary kiln and the other is a method using an electric kiln furnace.

The method using the rotary kiln will be described first. In the recovering method disclosed in Japanese Patent Publication No. Sho 59-20734, an iron dust is supplied into a rotary kiln together with a coke as a reducing agent, and valuable metal oxides are reduced. Although zinc, lead, cadmium, etc. have such high boiling points as about 2000° C. in their oxide states, respectively, their boiling points are lowered to about 1000° C. when they are in the reduced states. Zinc, lead and cadmium reduced in the rotary kiln are volatilized, and reoxidized by air within the rotary kiln. Those oxides of zinc, lead and cadmium, i.e., crude zinc oxides, are discharged from the rotary kiln together with exhaust gas and then recovered through a back filter. A non-volatile matter chiefly composed of a metal iron obtained by reducing the iron dust is recovered in the form of an iron clinker from an exhaust end of the rotary kiln. In a method disclosed in Japanese Patent Publication No. Sho 64-4572, an aluminum sludge is used as a reducing agent which is to be supplied into the rotary kiln.

In the recovering method using the rotary kiln as mentioned, there are the following drawbacks. That is, the iron dust is a fine powder having a grain size of about 1 to 10 μm. It is softened by heat of 1000° C. or higher, increased in adhesion strength and adhered to an inner wall surface of the rotary kiln. It requires much time and labor to remove the iron dust thus adhered. Furthermore, since the iron clinker has so small iron content as 50 to 60% and in addition, the iron content is varied significantly, it is not used as an iron material. As a result, the iron clinker is left as a secondary industrial exhaust.

Next, the method using an electric furnace will be described. In the method disclosed in U.S. Pat. No. 4,612,041 (Japanese counterparts: Patent Publication Nos. Sho 63-48934 and Hei 2-13017), an iron dust is agglomerated and this agglomerated matter is dried and preheated in a shaft furnace. Furthermore, in this shaft furnace, hydroxides, carbonates, etc. contained in the agglomerated iron dust are removed and a carbon contained in the iron dust is also burnt and removed. Such pretreated agglomerated matter is supplied into an induction furnace together with coke and reduced here. Zinc among components of the agglomerated iron dust is evaporated and recovered in the form of a metal zinc. Iron, lead and slag are molten in the induction furnace, and separated and recovered. In the shaft furnace, it is also possible that the iron oxide is reduced by adjusting the concentration of CO gas while restraining the reduction of the zinc oxide. Also in this case, the pretreated lump is supplied into the induction furnace together with the coke, and valuable metals are recovered in the same manner as above.

In the method disclosed in U.S. Pat. No. 4,612,041, since a large amount of electric energy is consumed in order to recover valuable metals using the induction furnace, the recovering cost becomes high. In this method, the iron dust is not reduced in the shaft furnace using the coke.

SUMMARY OF THE INVENTION

It is therefore an object of the present invention to provide a method for recovering valuable metals from an iron dust at a low cost.

According to one aspect of the present invention, there is provided a method for recovering valuable metals from an iron dust, comprising:

(a) agglomerating the iron dust;

(b) supplying the iron dust thus agglomerated, a lump coke, and a flux into a shaft furnace, reducing oxides of the valuable metals contained in the iron dust within the shaft furnace, volatilizing a volatilize metal containing zinc and lead among the reduced valuable metals within the shaft furnace, and accumulating the reduced molten metal iron and slag on a bottom portion of the shaft furnace;

(c) recovering a crude zinc oxide, which is obtained when the volatile metal is reoxidized, from an exhaust gas; and (d) separating the molten metal iron and slag accumulated on the bottom portion of the shaft furnace and recovering them.

From another aspect of the present invention, there is also provided method for recovering valuable metals from an iron dust, comprising:

(a) agglomerating the iron dust and a coke breeze while admixing the coke breeze;

(b) supplying the iron dust thus agglomerated and a flux into a shaft furnace, reducing oxides of the valuable metals contained in the iron dust within the shaft furnace, volatilizing a volatilize metal containing zinc and lead among the reduced valuable metals within the shaft furnace, and accumulating the reduced molten metal iron and slag on a bottom portion of the shaft furnace;

(c) recovering a crude zinc oxide, which is obtained when the volatile metal is reoxidized, from an exhaust gas; and (d) separating the molten metal iron and slag accumulated on the bottom portion of the shaft furnace and recovering them.

DETAILED DESCRIPTION OF THE EMBODIMENTS

Figure 1:
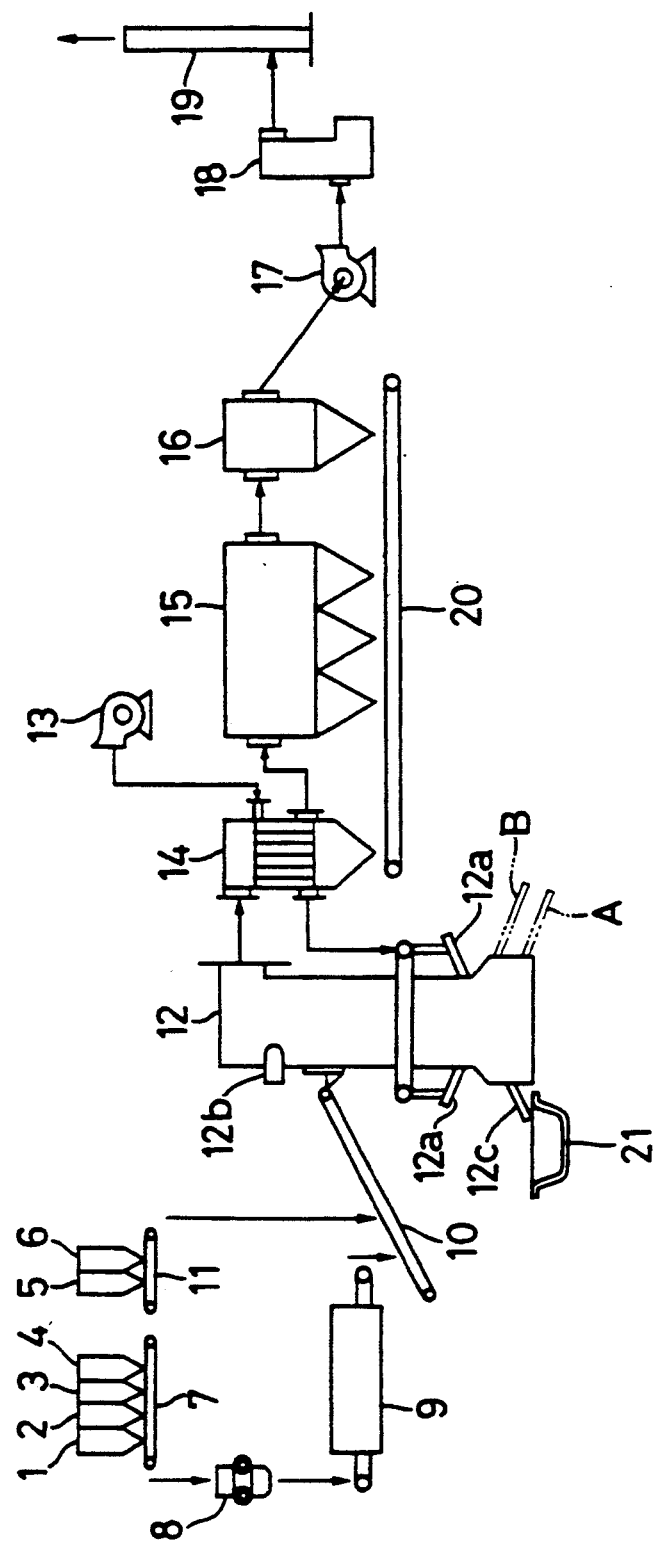
FIG. 1 is a schematic view showing a general construction of an apparatus for carrying out a method of the present invention.

A method of the present invention will now be described hereinafter. First, an iron dust as a material is agglomerated. The reason is as follows. The iron dust is so small in its particle size as 1 to 10 μm. If the iron dust is supplied into a shaft furnace as it is, gaps among the material grains in the furnace become less, and air flow becomes bad. Therefore, in order to enhance a smooth flow of air, the iron dust is agglomerated. The diameter of the agglomerated matter is preferably about 10 to 100 mm.

The iron dust is agglomerated in the following manner. The iron dust is agglomerated by admixing a binder such as bentonite, a pulp mill waste liquor or the like, and the resultant is heated to 300° to 400° C. and dried. By drying the resultant, the agglomerated matter can be increased in strength. Moisture content of the agglomerated matter is preferably about 2% after drying. Moisture content of the agglomerated matter before drying is usually about 10%.

Next, the iron dust thus agglomerated is supplied into the shaft furnace together with lump coke and flux.

The lump coke is served as a fuel for dissolving the agglomerated matter of the iron dust and also adapted to reduce metal oxide contained in the iron dust. The lump coke is used in order to enhance a smooth flow of air. The diameter of the lump coke is preferably about 10 to 100 mm.

The iron dust may be agglomerated by admixing coke breeze. The coke breeze acts as a reducing agent. By arranging the coke breeze as a reducing agent proximate to the iron dust, the reduction efficiency of the metal oxide is improved. The lump coke is used chiefly as fuel. Since the coke breeze is used as a reducing agent, the consumption quantity of the lump coke, which is more expensive than the coke breeze, can be reduced, and a recovering cost of the valuable metals can be reduced.

In the case where the coke breeze as a reducing agent is mixed to the agglomerated matter of the iron dust, the mixing quantity of coke breeze is preferably 1.2 to 1.5 times (i.e., about 150 to 200 kg per 1 ton of the iron dust) the quantity required for reducing the metal oxide such as iron, zinc, cadmium or the like. If the quantity is less than 1.2 times, reduction by the coke breeze becomes insufficient. On the contrary, if it exceeds 1.5 times, the agglomerated matter of the iron dust is deteriorated in strength.

The flux is adapted to make other substances than the valuable metals contained in the iron dust into a molten slag. As the flux, at least selected one among, for example, limestone ($CaCO_3$), dolomite ($CaCO_3 + MgCO_3$), quicklime ($CaO$), and sintered dolomite is used.

The interior of the shaft furnace can be divided roughly into a preheating zone, a reducing zone, and a melting zone located in this order from up to down. In the preheating zone, the above-mentioned material, i.e., the agglomerated iron dust, lump coke and flux are heated upto about 800° C. by combustion heat generated in the reducing zone as later described.

In the reducing zone, the iron dust is heated to about 1000° to 1500° C. by means of combustion of the lump coke, and metal oxide contained in the iron dust is reduced by the lump coke and/or coke breeze.

Volatile metals such as zinc, lead, cadmium and the like among the reduced metal oxides are evaporated and reoxidized into a crude zinc oxide by air in the shaft furnace, and then discharged from the shaft furnace together with exhaust gas so as to be recovered by the back filter.

When the iron dust is heated to 1000° C. or higher, it becomes to have adhesiveness. However, since the iron dust is agglomerated, it is not adhered to the inner wall surface of the furnace.

In the melting zone, slag and metal iron obtained by reducing the iron oxide contained in the iron dust are accumulated in their molten states. The molten metal iron and slag are separated by the difference in their specific gravities. In other words, the metal iron is located under and the slag is located above.

For combusting the coke, if it is intended merely to improve the combustion efficiency, the supply of the combustion air into a melting furnace may simply be increased. However, if the supply is excessively increased, the reduction efficiency of the metal oxide contained in the iron dust is lowered. In order to make it a level satisfying both combustion efficiency and reduction efficiency, it is preferable that the combustion air is supplied by the quantity of 13 to 18 $Nm^3$ per minute in oxygen equivalent value per 1 $m^2$ of a hearth area of the shaft furnace.

It is also preferable that an after-burning air enough to burn an unburned gas such as a carbon monoxide or the like is supplied to a top portion of the shaft furnace.

In order to reduce the consumption of coke, an aluminum refining sludge may be mixed to the iron dust when the latter is agglomerated. The aluminum sludge is a sludge generated when a residual aluminum is recovered during secondary refining operation of the aluminum, and contains a metal aluminum. As the aluminum refining sludge, one having a grain size of 16 to 400 mesh and containing 10 to 30 wt % of metal aluminum is preferable. In that case, a thermit reaction is taken place between the metal aluminum in the refining sludge and the zinc oxide contained as expressed by the following formula.

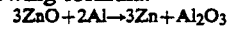
$$3ZnO + 2Al \rightarrow 3Zn + Al_2O_3$$

Since reduction is performed by this thermit reaction, the consumption of coke as a reducing agent can be reduced. The consumption of coke as a fuel can also be reduced by this reaction heat. Furthermore, since the aluminum refining sludge can be made harmless by the thermit reaction, cost for making the sludge harmless can be eliminated.

If the mixing ratio of the aluminum refining sludge is overly increased with respect to the iron dust, flowability of the melting slag is deteriorated because the percentage of $Al_2O_3$ in the melting slag is increased. Therefore, the mixing ratio is preferably 100 kg or less per 1 ton of iron dust.

Next, a recovering plant used for carrying out the above method will be described with reference to FIG. 1. The recovering plant includes tanks 1, 2, 3, 4, 5 and 6 which contain iron dust, coke breeze, aluminum refining sludge, bentonite, lump coke, and flux, respectively. The tanks 1 to 4 are disposed above a belt conveyor 7. The iron dust, coke breeze, aluminum refining sludge and bentonite contained in these tanks 1 to 4 are charged into a kneading/pressure briquetting machine 8 through the belt conveyor 7 and agglomerated here. Then, they are dried in a heating and drying machine 9 and supplied onto a belt conveyor 10. On the other hand, the tanks 5, 6 are disposed above the belt conveyor 11, and the lump coke and flux contained in these tanks 5, 6 are supplied onto the belt conveyor 10 through the belt conveyor 11.

The agglomerated matter of the iron dust, lump coke and flux supplied onto the belt conveyor 10 are supplied into the shaft furnace 12.

Here, as the shaft furnace 12, for example, an iron shell water cooling type furnace having a hearth diameter of 1.8 m and a height of 10 m is used. The shaft furnace 12 has seven air blower ports 12a each of a diameter of 120 mm. Air heated to 350° to 400° C. in the heat exchanger 14 is supplied into the shaft furnace 12 from the respective air blower ports 12a by the air blower 13. The air blower ports 12a are disposed in location away from the bottom of the shaft furnace 12 by a predetermined distance. It is necessary that the melting zone in the shaft furnace 12 is normally disposed in location lower than the air blower port 12a.

Exhaust gas discharged from the top portion of the shaft furnace 12 is discharged from a chimney 19 through the heat exchanger 14, a gas cooler 15, a back filter 16, an exhauster 17, and a wet type dust collector 18. At that time, crude zinc oxide contained in the exhaust gas is partially recovered by the heat exchanger 14, and a most part of it is recovered by the gas cooler 15 and back filter 16. Then, it is transferred by a belt conveyor 20 so as to be collected.

The top portion of the shaft furnace 12 is provided with a secondary air inlet port 12b. Since the exhaust gas at the top portion of the shaft furnace 12 is drawn by the exhauster 17, a sufficient amount of secondary air can be supplied to the top portion of the shaft furnace 12 through the secondary air inlet port 12b.

On the other hand, the non-volatile matter melted in the shaft furnace 12 is flowed into a trap pot 21 from a tap hole 12c formed in the vicinity of the bottom portion of the shaft furnace 12. In the shaft furnace 12, the molten non-volatile matter is separated into a lower metal iron layer and an upper slag layer by the difference of their specific gravities. However, if the shaft furnace 12 is a small type furnace, they are flowed into the trap pot 21 altogether from one tap hole 12c. The molten matter flowed into the trap pot 21 is separated into a lower metal iron and an upper slag by the difference of their specific gravities and hardened.

In the case of a large type shaft furnace 12, as shown by imaginary lines of FIG. 1, the tap holes A, B may be vertically arranged so that the metal iron can be flowed out of the lower tap hole A and the slag can be flowed out of the upper tap hole B.

As described in the foregoing, according to a process for recovering valuable metals from an iron dust using a shaft furnace, a crude zinc oxide and a metal iron can be recovered without allowing an iron dust to be adhered to the inner wall surface of the shaft furnace. Moreover, since the metal iron recovered is high in quality, the metal iron can be utilized as a material for making iron. Since the slag is harmless, a secondary treatment is not required, and the slag can be widely used as an aggregate for construction and others. In addition, since a large amount of electric energy is not required, recovering cost can be reduced.

TEST EXAMPLE

A test for recovering valuable metals from a steel making dust generated in an electric steel making furnace was carried out using the above-mentioned recovering plant. In this Test Example 1, 5 ton/Hr of a steel making dust having the compositions shown in the under-listed Table 1, 1 ton/Hr of a coke breeze, 0.25 ton/Hr of an aluminum refining sludge, 0.25 ton/Hr of a bentonite as a binder were added with water and agglomerated by the kneading/pressure briquetting machine 8 and then dried by the heating and drying machine 9. Thereafter, the resultant was supplied into the shaft furnace 12 while adding 0.75 ton/Hr of a lump coke and 0.35 ton/Hr of a limestone as a flux. Air heated upto 400° C. was also supplied of 180 $Nm^3$/min from the air blower ports 12a.

TABLE 1

| Zn | Fe | Pb | Cd | Mn | Cu | $Cr_2O_3$ | $SiO_2$ | CaO | MgO | $Al_2O_3$ |
|---|---|---|---|---|---|---|---|---|---|---|
| 25.0 | 27.0 | 3.50 | 0.01 | 2.40 | 0.30 | 0.10 | 1.50 | 2.40 | 1.80 | 1.50 |

In this Table 1, the numerical figure shows weight % (the same is true to the Tables listed hereunder). In Table 1, Zn, Fe, Pb, Cd, Mn and Cu show metal components contained in the respective oxides.

As a result of the above 1.9 ton/Hr of a crude zinc oxide and 1.3 ton/Hr of a metal iron were recovered. The compositions of such recovered crude zinc oxide and metal iron were generally constant. The compositions are as shown in the following Table 2 and Table 3.

TABLE 2

| Zn | (ZnO) | Fe | Pb | Na + K | $SiO_2$ | CaO | MgO | $Al_2O_3$ |
|---|---|---|---|---|---|---|---|---|
| 63.36 | (78.88) | 1.76 | 5.77 | 3.30 | 0.40 | 0.20 | 0.15 | 0.35 |

In Table 2, Zn, Fe and Pb show metal components contained in the respective oxides.

TABLE 3

| Fe | C | Si | Mn | P | S |
|---|---|---|---|---|---|
| 96.1 | 2.88 | 0.13 | 0.16 | 0.180 | 0.085 |

The recovered quantity of the slag was 1.45 ton/Hr, and its composition was as per the under-listed Table 4. As apparent from Table 4, the recovered slag was harmless and can be utilized as an aggregate for construction and others.

TABLE 4

| $SiO_2$ | CaO | MgO | $Al_2O_3$ | FeO |
|---|---|---|---|---|
| 29.5 | 21.6 | 7.2 | 22.5 | 8.8 |

TEST EXAMPLE 2

Iron dust generated in a blast furnace was recovered as a wet dust, and valuable metals were recovered from this wet dust using the above-mentioned recovering plant. The composition of the wet dust as shown in Table 5. The moisture content of the wet dust was adjusted to about 10%. In this Test Example, 5 ton/Hr of the wet dust and 0.25 ton/Hr of a bentonite as a binder were agglomerated in the kneading/pressure briquetting machine 8. Since an iron making dust generated from the blast furnace contains about 30 wt. % of carbon, a coke breeze and an aluminum refining sludge were not added to the iron making dust.

TABLE 5

| Fe | Zn | Pb | Mn | Cu | $SiO_2$ | CaO | MgO | $Al_2O_3$ | T.C. |
|---|---|---|---|---|---|---|---|---|---|
| 35.0 | 2.90 | 0.70 | 0.40 | 0.03 | 5.20 | 4.10 | 0.90 | 2.80 | 33.0 |

In this Table 5, Fe, Zn, Pb, Mn and Cu show metal components contained in the respective oxides, and T. C. shows a total carbon.

The above agglomerated matter was supplied into the shaft furnace 12 while adding 0.75 ton/Hr of a lump coke and 0.55 ton/Hr of a limestone, and air of 400° C. was sent 150 Nm$^3$/min. As a result, 0.2 ton/Hr of a crude zinc oxide and 1.7 ton/Hr of a metal iron were recovered. The compositions of such recovered crude zinc oxicde and metal iron were as shown respectively in Table 6 and Table 7.

TABLE 6

| Zn | (ZnO) | Fe | Pb | Na + K | SiO$_2$ | CaO | MgO | Al$_2$O$_3$ |
|---|---|---|---|---|---|---|---|---|
| 56.36 | (70.17) | 3.76 | 8.50 | 2.90 | 1.40 | 1.20 | 0.80 | 1.40 |

In Table 6, Zn, Fe and Pb show metal components contained in the respective oxides.

TABLE 7

| Fe | C | Si | Mn | P | S |
|---|---|---|---|---|---|
| 95.5 | 3.15 | 0.23 | 0.08 | 0.170 | 0.065 |

The recovered quantity of the slag was 1.4 ton/Hr, and its composition was as per the under-listed Table 8. The recovered slag was harmless as that of Test Example 1 and can be utilized as an aggregate for construction and others.

TABLE 8

| SiO$_2$ | CaO | MgO | Al$_2$O$_3$ | FeO |
|---|---|---|---|---|
| 37.7 | 38.5 | 3.2 | 11.9 | 6.5 |

What is claimed is:

1. A method for recovering metals from an iron dust containing oxides of iron, zinc and lead, comprising:
   (a) agglomerating the iron dust while admixing an aluminum refining sludge with the iron dust, the aluminum refining sludge containing a metal aluminum which serves as a reducing agent;
   (b) supplying the agglomerated iron dust, a lump coke, and a flux into a shaft furnace, reducing the oxides of iron, zinc and lead to produce a metal iron, a metal zinc, a metal lead and a slag within the shaft furnace, the metal zinc and the metal lead being volatilized within the shaft furnace, and reoxidized to produce a crude zinc oxide, and the metal iron and slag being molten and accumulated on a bottom portion of the shaft furnace;
   (c) recovering the crude zinc oxide from an exhaust gas; and
   (d) separating the molten metal iron and slag accumulated on the bottom portion of the shaft furnace and recovering them.

2. The process according to claim 1, wherein the iron dust is agglomerated while admixing a coke breeze with the iron dust.

3. The method according to claim 1, further comprising supplying the reduced molten metal iron and slag into a trap pot from an outlet port formed in the vicinity of the bottom portion of the shaft furnace, separating the reduced molten metal iron from the slag by a difference in their specific gravities, and hardening them in the trap pot.

4. The method according to claim 1, further comprising separating the reduced molten metal iron from the sludge by a difference in their specific gravities, and separately taking the reduced molten metal iron and the slag out of the shaft furnace through separate outlet ports which are vertically spaced apart.

5. The method according to claim 1, further comprising providing a source of combustion air, in a quantity of from approximately 13 to approximately 18 Nm$^3$ per minute in oxygen equivalent value per 1 m$^2$ of hearth area to the shaft furnace.

6. The method according to claim 1, further comprising supplying a source of after-burning air to a top portion of the shaft furnace.

7. The process according to claim 1, wherein the aluminum refining sludge has a grain size of 16 to 400 mesh and contains 10 to 30 wt. % of metal aluminum.

8. The process according to claim 1, wherein the mixing ratio is equal to or less than 100 Kg of aluminum refining sludge per 1 ton of iron dust.

* * * * *